(12) United States Patent
Joannou

(10) Patent No.: US 6,237,970 B1
(45) Date of Patent: May 29, 2001

(54) LATCH FASTENER MECHANISM FOR THIN SHEET MATERIALS

(76) Inventor: Constantinos J. Joannou, 62 Lortie Street, Aylmer, Quebec (CA), J9H 4G5

(*) Notice: Subject to any disclaimer, the term of this patent is extended or adjusted under 35 U.S.C. 154(b) by 0 days.

(21) Appl. No.: 09/330,126

(22) Filed: Jun. 11, 1999

(30) Foreign Application Priority Data

Apr. 23, 1999 (CA) .................................................. 2270085

(51) Int. Cl.$^7$ .............................. E05C 19/10; F16B 21/00
(52) U.S. Cl. ......................... 292/241; 292/300; 411/552; 411/553
(58) Field of Search ............................. 292/300, 56, 108, 292/209, 210, 353, DIG. 38, 240, 241; 411/552, 553, 508, 353, 913

(56) References Cited

U.S. PATENT DOCUMENTS

| | | | | |
|---|---|---|---|---|
| 2,128,305 | * | 8/1938 | Lambert | 292/241 |
| 2,186,747 | * | 1/1940 | Albin | 292/241 |
| 2,239,125 | * | 4/1941 | Summers | 411/552 |
| 2,505,539 | * | 4/1950 | Tinnerman | 292/241 |
| 2,515,507 | * | 7/1950 | Glitsch | 292/241 |
| 2,713,284 | * | 7/1955 | Bedford, Jr. | 411/508 |
| 3,123,389 | * | 3/1964 | Biesecker | 292/218 |
| 3,567,263 | * | 3/1971 | McKinney | 292/241 |
| 3,611,861 | * | 10/1971 | Schulze | 85/5 |
| 3,893,208 | * | 7/1975 | Yuda | 24/73 P |
| 4,128,923 | * | 12/1978 | Bisbing | 24/221 RE |
| 4,604,776 | * | 8/1986 | Takahashi | 24/453 |
| 4,611,841 | * | 9/1986 | Ravinet | 292/241 |
| 4,629,356 | * | 12/1986 | Hayashi | 403/408.1 |
| 4,657,462 | * | 4/1987 | Hoen | 411/552 |
| 4,705,442 | * | 11/1987 | Fucci | 411/510 |
| 4,762,437 | * | 8/1988 | Mitomi | 403/406.1 |
| 4,813,726 | * | 3/1989 | Ravinet | 292/241 |
| 4,936,066 | * | 6/1990 | Rutsche et al. | 52/238.1 |
| 4,981,310 | * | 1/1991 | Belisaire | 285/162 |
| 5,044,679 | * | 9/1991 | Barnes et al. | 292/207 |
| 5,123,795 | * | 6/1992 | Engel et al. | 411/552 |
| 5,230,542 | * | 7/1993 | Wiese | 292/241 X |
| 5,251,467 | * | 10/1993 | Anderson | 70/370 |
| 5,718,549 | * | 2/1998 | Noda et al. | 411/553 |

FOREIGN PATENT DOCUMENTS

861090 * 1/1941 (FR) .................................... 411/553

* cited by examiner

Primary Examiner—Teri Pham Luu
(74) Attorney, Agent, or Firm—David J. French

(57) ABSTRACT

A fastener for coupling two members together is provided with a rotatable core carried by a first member and a protruding elbow for insertion through an elongated slot in the second member. By rotating the core, the elbow is caused to swing over the outer surface of the second member, adjacent the slot, coupling the two members together. The inner, member-engaging surface of the elbow is tapered to form a ramp-like surface that, with rotation, draws the two members together and frictionally fixes the elbow in its engaged position. The latch core when installed in a tubular first member may be provided with resiliently based, expanding locking members positioned adjacent to the core to secure the latch within the hollow core of the tubular first member.

9 Claims, 7 Drawing Sheets

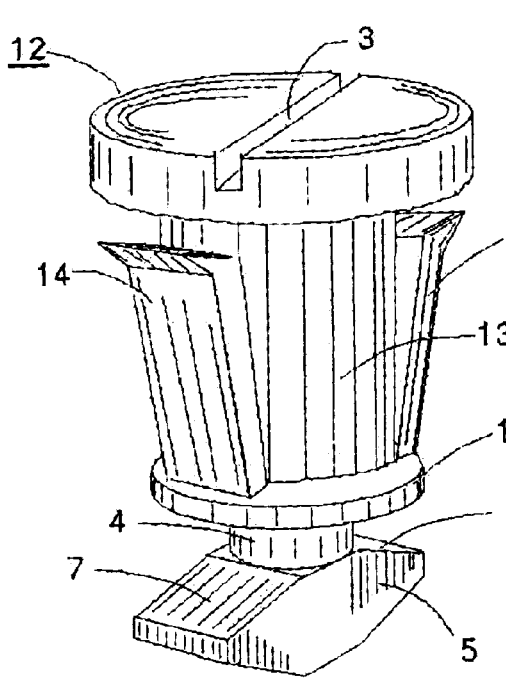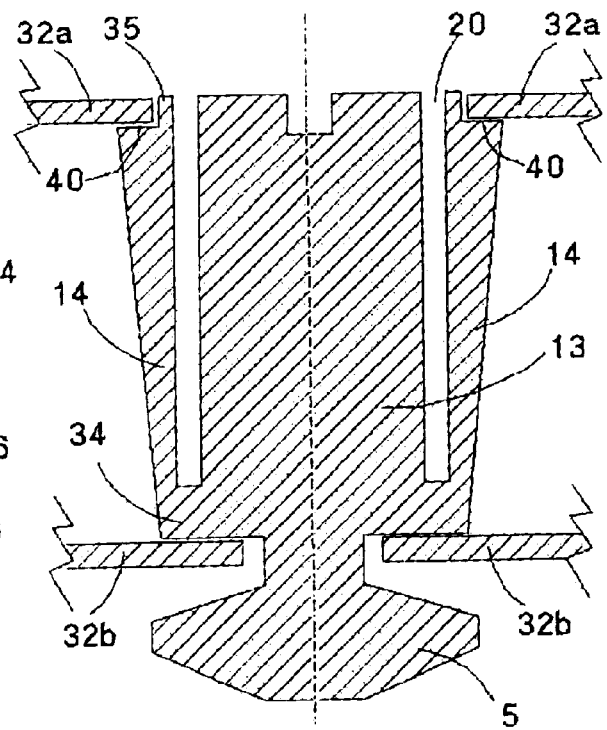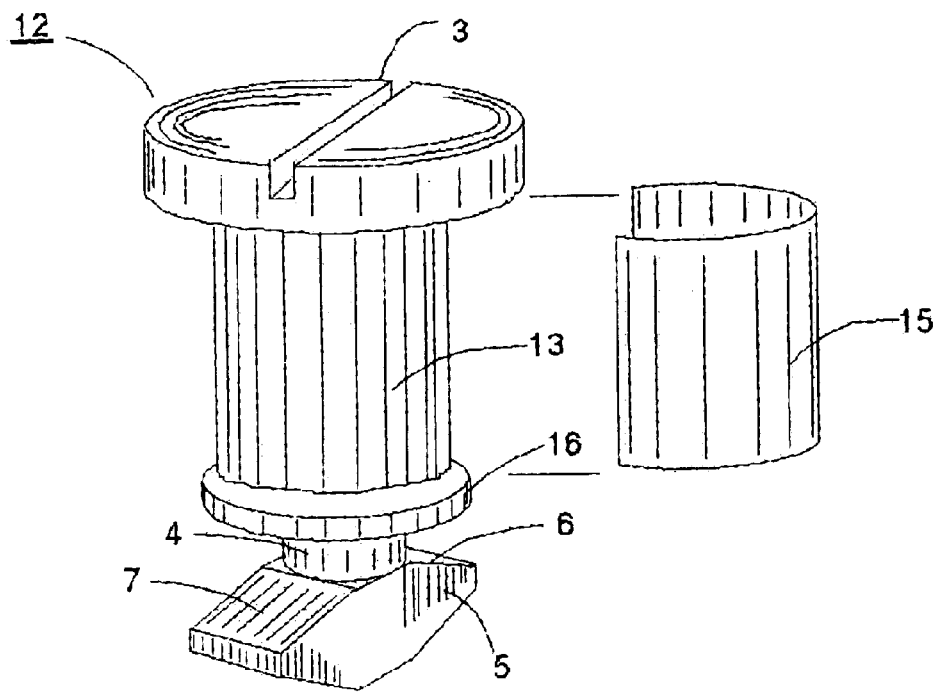
Fig. 3a
Fig. 3b
Fig. 3c

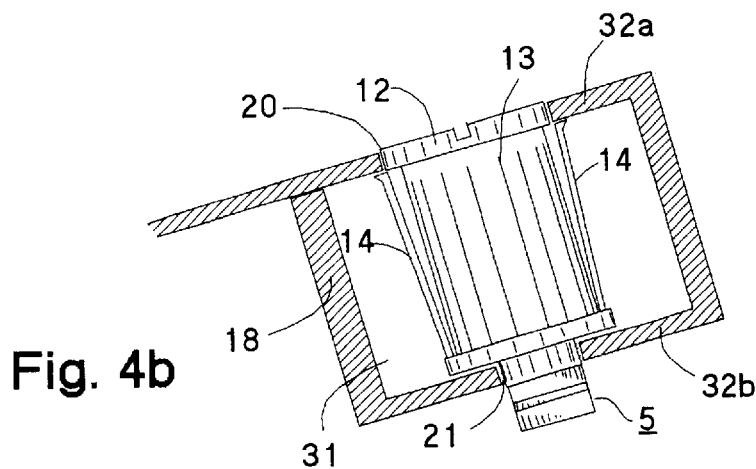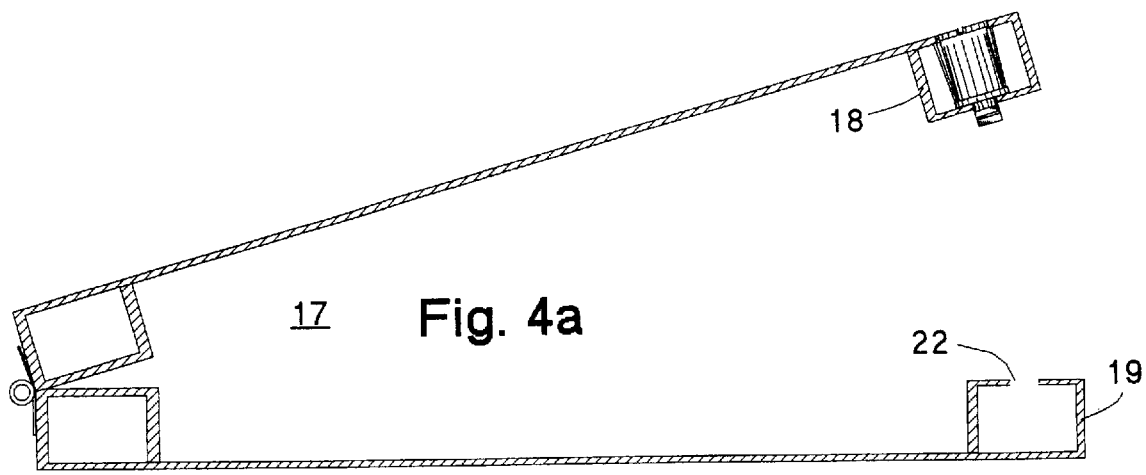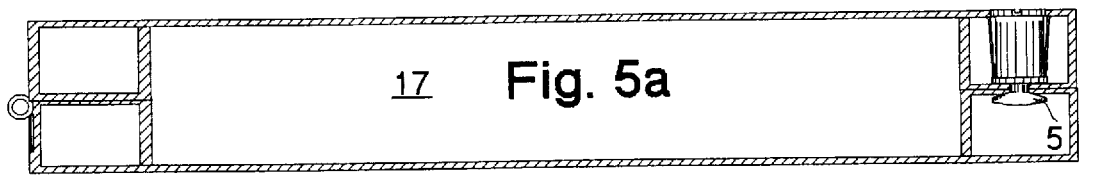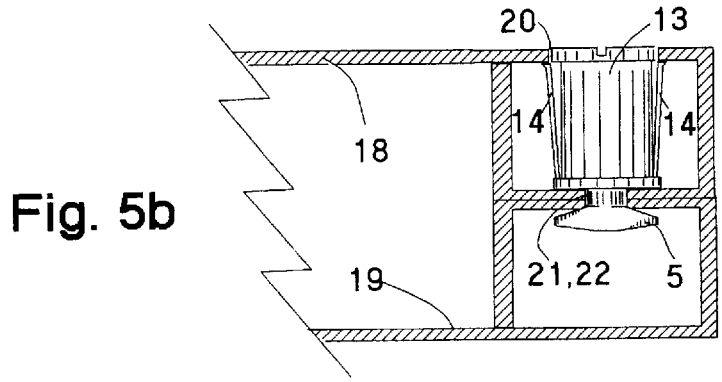

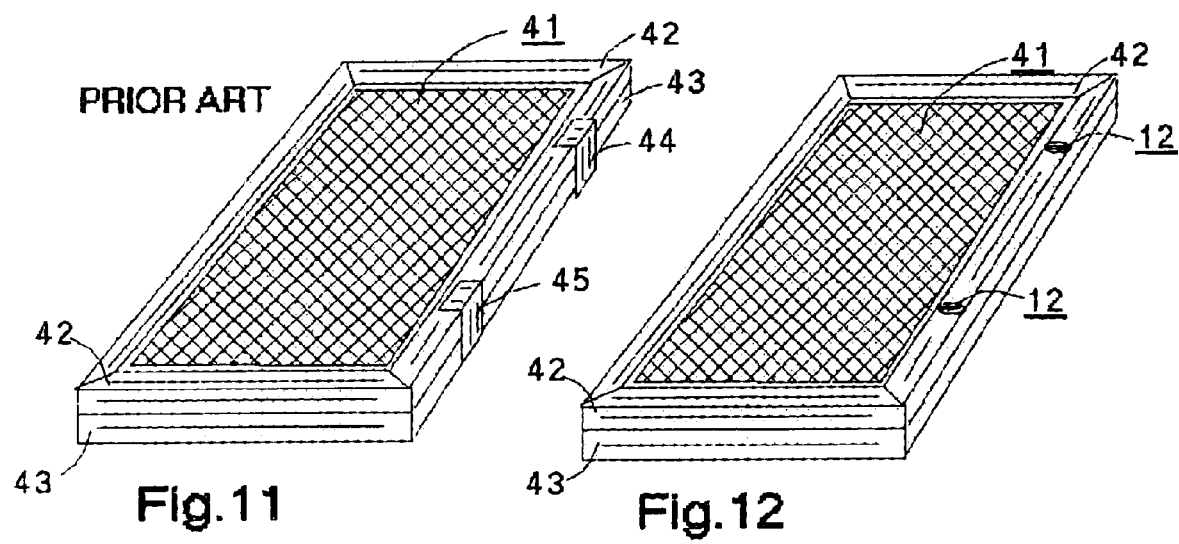
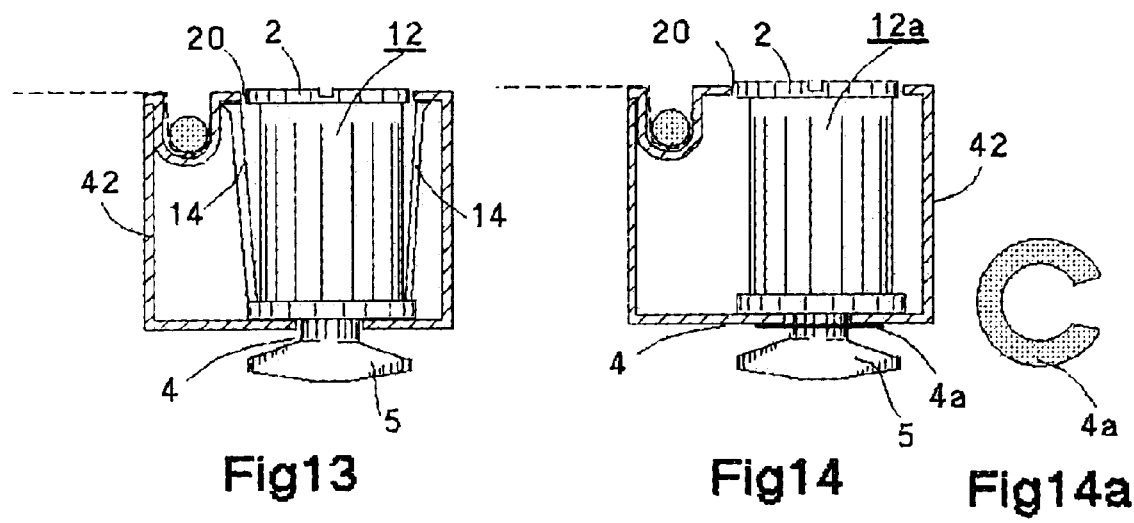

LATCH FASTENER MECHANISM FOR THIN SHEET MATERIALS

FIELD OF THE INVENTION

This invention relates to a fastener used to hold together thin sheets or panels of metal or plastic. More particularly, it relates to a simplified form of connector for ready installation that provides a disengageable clamping action between the parts being held together.

BACKGROUND TO THE INVENTION

In previous art, disengageable fasteners or latches used to clamp two members, such as pieces of sheet metal together have included a simple handle coupled to a rotating arm that can be swung into a wedge-shaped receptacle to effect a latching engagement. Kitchen cupboard doors have been provided with latches of this type. Such a latching mechanism is externally mounted and has parts that extend outwardly from the pieces being fastened together.

An existing electronic air filter design comprises two outer frames of sheet metal which are closed to enclose trapping media. External clips are presently used as latches to hold the frame together. These clips protrude outwardly from the filter's frame and interfere with the insertion and extraction of the filter from a slot in an air handling unit.

A need exists for a fastener which is substantially non-protruding, or minimally protruding, from surfaces to be coupled together. The fastener should be readily installable and, once installed, should be easily manipulated to effect engagement and disengagement with respect to the members being coupled together. This invention addresses such a need.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

According to one feature of the invention described herein a first carrier member supports a latch core from which protrudes a rotatable elbow. This protruding elbow is dimensioned to fit in one orientation through a perforation in the form of an elongated slot present in a second member that is to be latched to the first member. Upon rotation of the latch core the protruding elbow swings laterally to overlie the side of the slot formed in the second member. The inside surface of the elbow which is positioned for engaging the second member is ramp-like in form so that when the elbow is operated by turning it to overlie the second member, the second member slides up the ramped inside surface of the elbow drawing the second member to press against the first member. The core is provided with a head or flange located on the other side of the first member from the elbow which prevents the core from being pulled-through the opening in the first member. This head, or the end of the core, may also be slotted to enable the core to be turned.

By a further feature of the invention, the first member is of a box-tube construction having perforated outer and inner walls with a cavity formed therebetween. The outer wall is the wall which is more remote from the second member to be coupled to the first member by the latch. Preferable, the latch core lies within the cavity without protruding significantly on the outward side of the outer wall of the first member. The core carries a head or flange that prevents it from being pulled fully through the first member. The latch core in this embodiment is provided with engagement means, preferably in the form of a slot, by which it may be engaged to effect its rotation.

The core may be retained within the first member by a retention means such as a conventional, expandable, C-shaped split lock washer. It may also be retained by interior, resilient retention means, contained within the cavity, that, once inserted into the core-receiving cavity in the first member, expands within the cavity and engages the inner side of the outer wall of the first member. This retention means may optionally be in the form of a split cylindrical sleeve, or may comprise one or more longitudinally extending locking arms that are carried by the core and spring outwardly into the cavity to fix the core in place once the core is inserted within the cavity. These arms may nest against the core within the diameter of the head or flange for ready insertion into the cavity.

In a further variant, the free ends of the arms have protruding tab's that extend beyond the ends of the arms. These tabs extend into the hole through which the core has been passed, and provide access to displace the arms towards the core for removal of the latch in cases where replacement is required.

The foregoing summarizes the principal features of the invention and some of its optional aspects. The invention may be further understood by the description of the preferred embodiments, in conjunction with the drawings, which now follow. These and other features of the invention will be more apparent in view of the drawings and description which follows:

SUMMARY OF THE FIGURES

FIG. 3a is a pictorial view showing an alternative construction of the latch carrying elastically biased locking arms for installation in a hollow, tubular frame member;

FIG. 3b is a cross-sectional side view of a variant of the latch of FIG. 3a showing details including a release tab on the locking arms;

FIG. 3c shows the construction of FIG. 3a but using an elastically compressible split cylinder in place of the locking arms;

FIGS. 4a and 5a show close-up detailed cross-sectional side views of the latch of FIG. 3a installed in a tubular frame that is to be latched to a second tubular member;

FIGS. 4b and 5b close-up detailed cross sections of the latch of FIGS. 4a and 5a before and after engagement;

FIG. 11 depicts an air filter frame with prior art hook latches;

FIG. 12 is a pictorial depiction of an air filter frame incorporating the latch of the invention;

FIGS. 13 and 14 contrast a latch as in FIG. 5b with a latch held in place by a split locking washer as in FIG. 2d.

FIG. 14a shows a C-shaped, split locking washer in plan view.

DESCRIPTION OF THE PREFERRED EMBODIMENT

Figure 1:
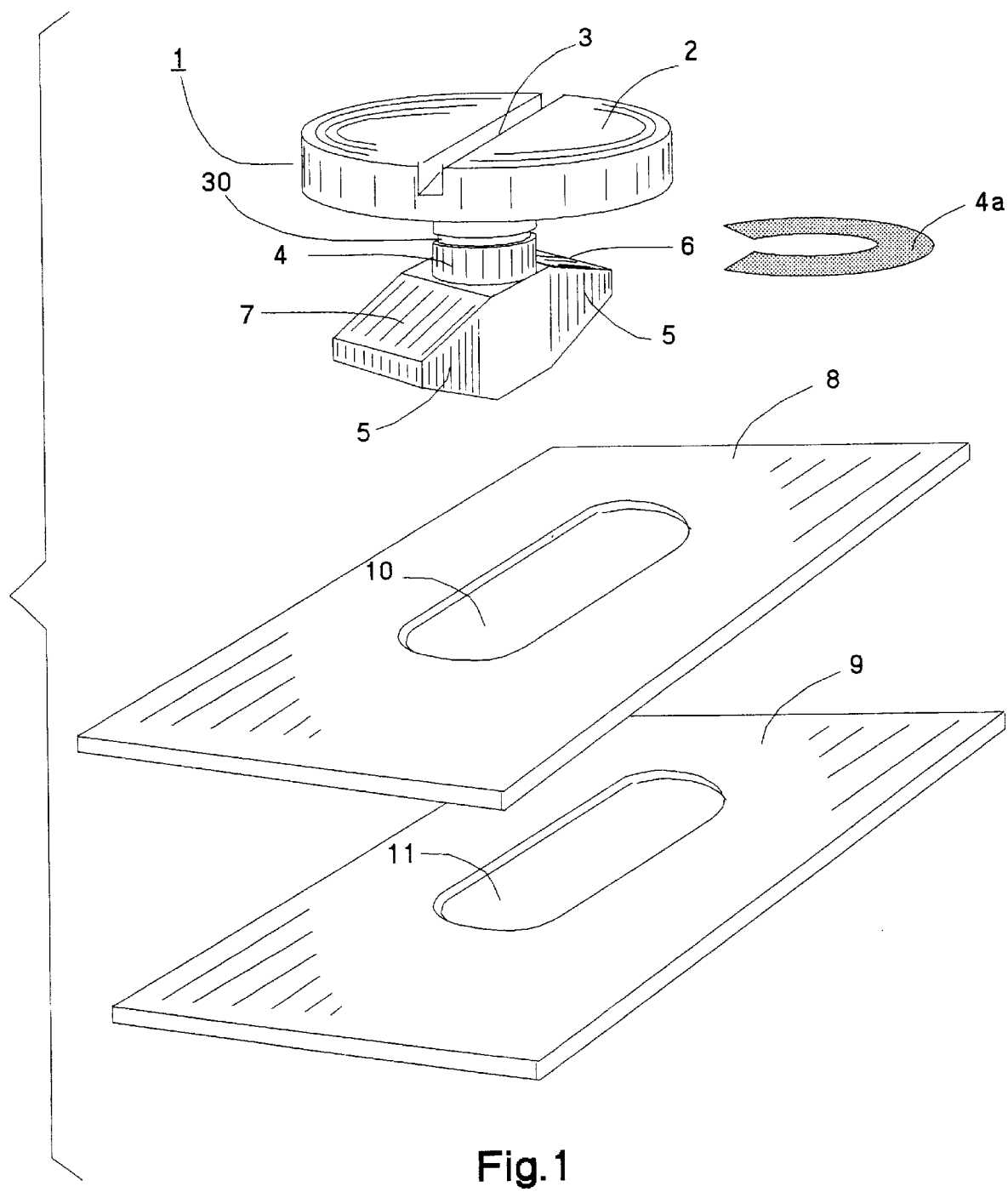
FIG. 1 shows a pictorial view of the latch according to the invention and two pieces of sheet material being latched together.

In FIG. 1, the latch 1 comprises a head 2 with a slot 3 for operating the latch 1 with a screwdriver or a coin. A shaft 4 connects head 1 to dual elbows 5. Elbows 5 are provided by a transversely oriented rectangular bar featuring two sloping, ramp-like surfaces 6 and 7 on each inner surface of the elbows 5. Two sheet members 8,9 to be latched together, are provided with slots 10 and 11 formed through their bodies. Slots 10 and 11 have a width such that dual elbow 5, when aligned with the slots 10, 11, can just pass through the slots 10, 11. A retainer C-clip, split washer 4a of resilient material holds the latch 1 from coming back out of the first sheet 8 by engaging with a groove 30 formed around shaft 4. The head 2 in seating on the first member 8 serves as a seating collar which prevents the latch 1 from pulling through the first sheet 8.

While two slots 10,11 are shown, only the second sheet remote from the latch need be slotted. The first sheet 8 may have a more circular opening wide enough to allow the dual elbows 5 to pass through. In such case the diameter of the head 2, or other means, should limit the complete passage of the latch 1 through the opening in the first sheet 8.

Figure 2A:
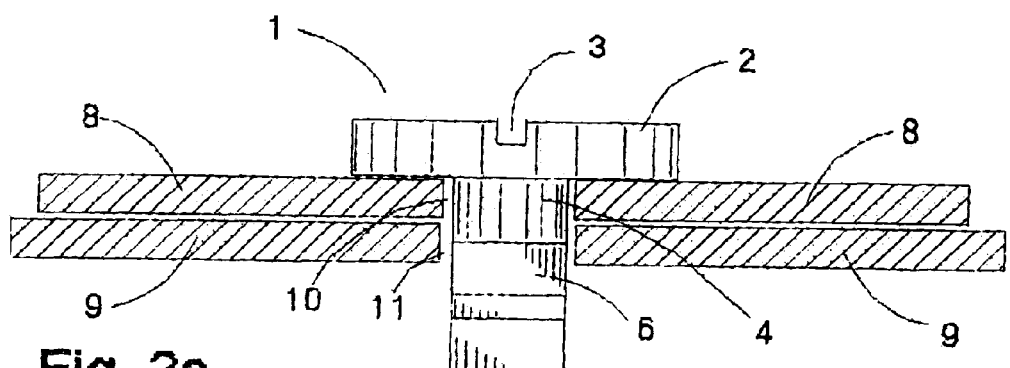
FIG. 2a and FIG. 2b are partially cross-sectioned side views showing the latch of FIG. 1 in open and closed positions respectively without use of a retaining clip.
Figure 2B:
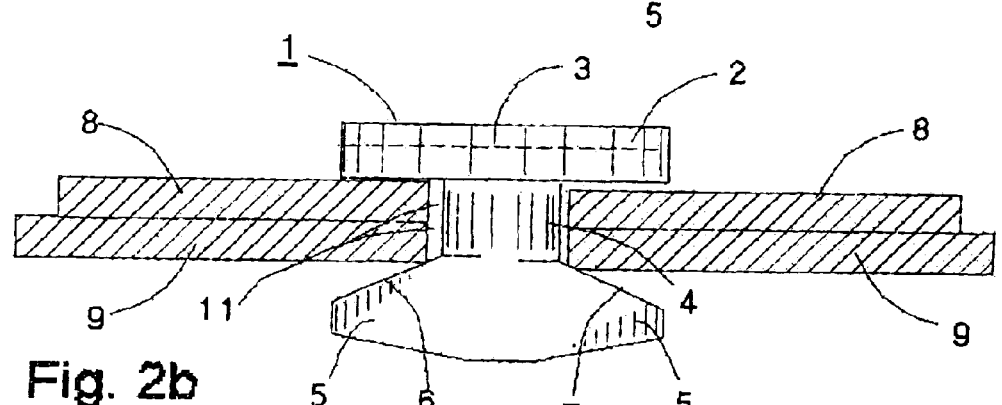

FIGS. 2a and 2b depict progressive stages in the engagement of the latch 1 in clamping the two pieces of sheet material 8,9 together. In FIG. 2a, the latch 1 with its dual elbows 5 is passed through the rectangular slots 10, 11 of both sheets 8,9. In FIG. 2b the latch 1 has been turned one quarter turn. When the latch 1 is turned, the bordering edges of the bottom slot 11 are drawn against the ramped surfaces 6 and 7 and sheet 9 is pressed against sheet 10 thus providing a clamping action. Because of the sloping orientation of the upper surfaces 6,7 on the elbows 5, the elbows 5 engage the lower sheet 9 while the sheets 8,9 are not fully pressed together. The position of the ramped surfaces 6,7 along shaft 4 below the head 2 can be selected to ensure that, at the final clamped position of FIG. 2b, these surfaces 6,7 positively press the two sheets 8,9 together.

Figure 2C:
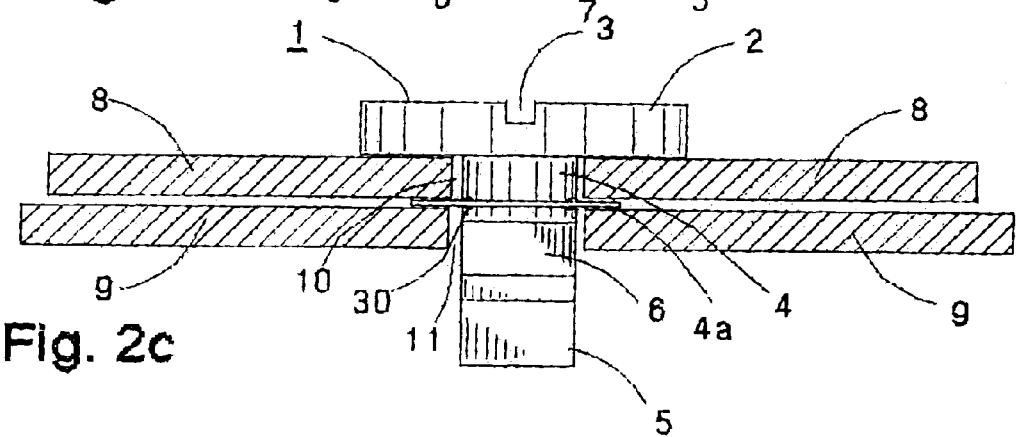
FIGS. 2c and 2d show the latch of FIGS. 2a and 2b with a C-shaped, split washer retaining clip present to secure the latch to the upper of the two sheets.
Figure 2D:
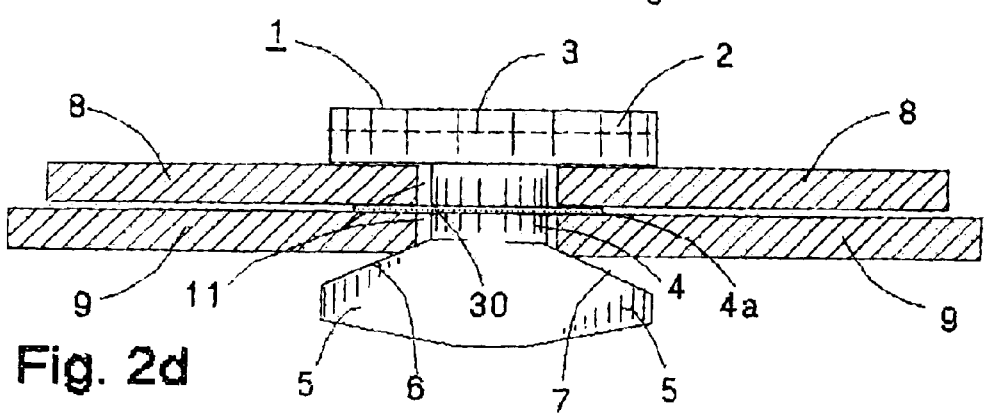

FIGS. 2c and 2d correspond to FIGS. 2a and 2b respectively, but with the added pressure of an optional C-shaped, split retainer clip 4a which prevents latch 1 from falling out of sheet 8 when the latch is disengaged. To accommodate the clip 4a, a groove 30 is formed around the shaft 4.

FIG. 3 shows another version of a self-retaining latch 12 having a lower, flanged, seating collar or flange 16, a central shaft or core 13 and spring-mounted locking arms 14 or resilient split/cylinders connected to the core 13. This arrangement allows this self retaining latch 12 to be installed in a hollow, tubular frame as shown in FIGS. 4a through 5b. The collar 16 serves the function of the head 2 in limiting the latch 12 from passing fully through the first member. With the collar 16 present, the head 2 is optional.

Latch 12 is installed in a hole formed in a hollow frame 18 as in FIG. 4b having a cavity 31 present in its interior defined by upper 32a and lower walls 32b. When latch 12 is inserted in upper hole 20, formed in upper wall 32a, locking arms 14 are initially pressed against the core 13 to permit the arms 14 to fit through the hole 20 preferably, with the arms nested against the core, they occupy a diameter that is less than of the head or flange. After passing through hole 20 the arms 14 are elastically biased at their base end connection 34 to the core 13 to spring away from the core 13. The arms 14 engage by locking at surface 40 their upper, free ends with the underside of the upper wall 32a adjacent the upper hole 20. This prevents the latch 12 from coming out of frame 18. To operate the latch 12, the latch 12 is turned by one quarter turn and the clamping action is as described above. Small optional tabs 35 extend beyond the locking surfaces 40 on the ends of the arms 14. These tabs 35 protrude through hole 20, as shown in FIG. 3b, and allow the arms 14 to be displaced inwardly for removal of the latch 12 from the hole 20.

FIG. 3c shows the same latch as that of FIG. 3a but without locking arms 14. Instead, a retainer clip 15 in the form of an elastically compressible split cylinder extending from collar 16 to the underside of the upper wall 32a prevents the latch from coming out of the hollow frame 18. Thus the self-retaining latch 12 operates on the basis of resilient retaining means, positioned adjacent the core 13 and dimensioned to spring outwardly into the cavity 31 and engage the surface of an upper wall 32a after insertion through a hole 20 formed therein.

FIGS. 4a through 5b show the cross-sectional view of a hinged box with hollow peripheral frame members 18, 19. The upper wall 32a of the hollow frame 18 has a hole 20 just large enough to allow latch 12 to go through. Within the lower wall 32b of the hollow frame 18, and within the upper wall of hollow frame 19, there are rectangular slots 21 and 22 similar to slots 10 and 11 of FIG. 1. As described previously, rotation of the elbows 5 to a position transverse to the slot 21 draws the parts 18, 19 into locking engagement—See FIG. 5b.

FIG. 14 shows an alternate retaining means for a latch with a core 13, based on use of a C-shaped split washer clip 4a as shown in FIG. 14a. All of these latch designs operate on the basis of the presence of the elbowed engagement mechanism. The dual elbows 5 of the latch 12 are rotated 90 degrees to provide the clamping action as described with respect to FIGS. 2a and 2b.

Figure 6:
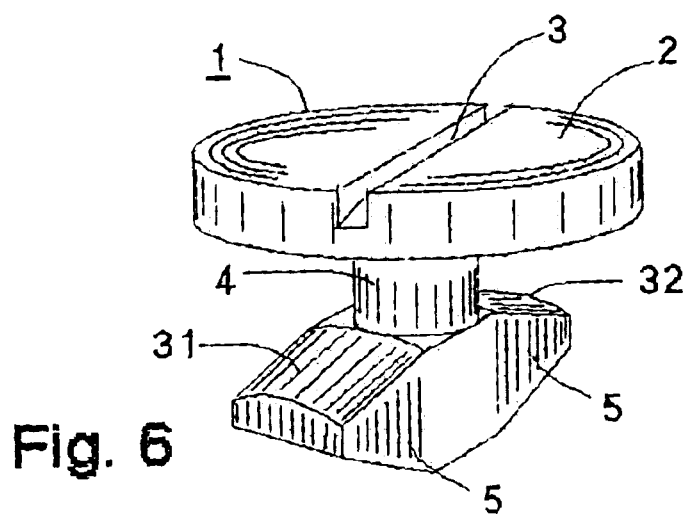
FIGS. 6, 7, and 8 are pictorial views of the latch of FIG. 1 depicting variants in the shape of the dual locking elbows.

While the latch 1 of FIGS. 1–3c is shown as having flat, angled, ramped surfaces 6,7, such surfaces may be angled so as to be ramped in differing directions. In FIG. 6, the upper surface 31, 32 of the dual elbows 5 are not only downwardly inclined, but are also cylindrical in cross section. This makes the operation of the latch easier because the bottom sheet 9, when the latch 1 is rotated, does not encounter the edge of the sheet 9 with a sharp corner but with a smoother, rounded surface 31,32.

Figure 7:
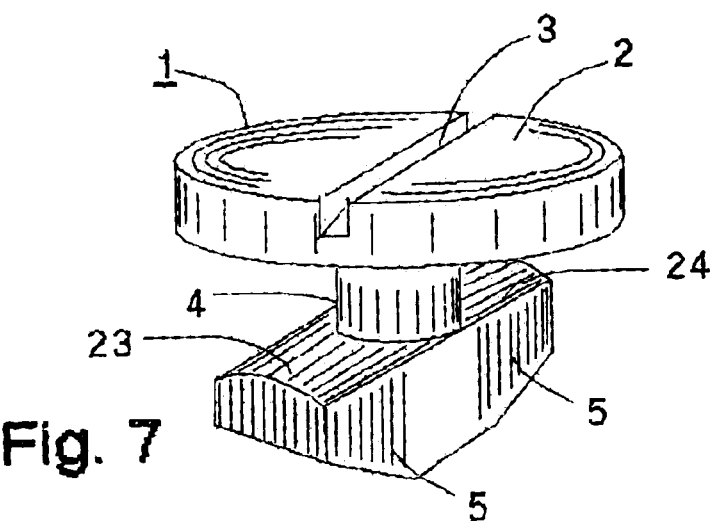

Another alternative way of constructing the upper surfaces of the dual elbows 5 is as shown in FIG. 7. This is a similar configuration to that of FIG. 6 but surfaces 23 and 24 are not downwardly sloping but are horizontal. Nevertheless, the curvature of the surfaces 23,24 makes them ramped in a different orientation. The operation of this arrangement is the same as that of FIG. 1. The inclined angle of the surfaces 23,24 is chosen to tend to draw the sheets 8,9 being coupled more closely together.

Figure 8:
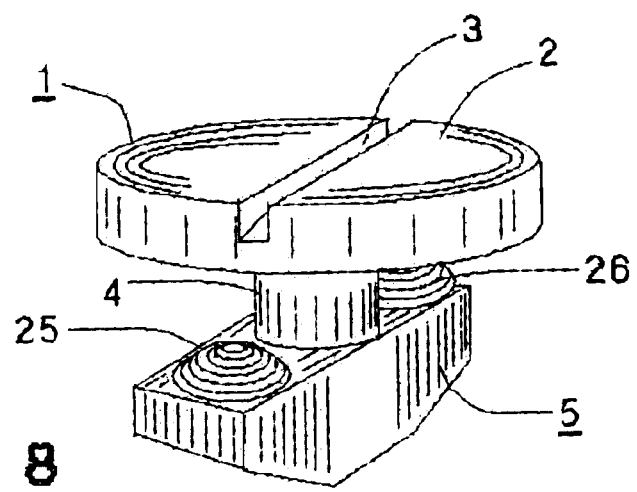

Yet another alternative for the construction of the upper surfaces of the dual elbows 5 is shown in FIG. 8. In this case, the entire upper surfaces of the elbows 5 are not sloping. Instead they are, for their greater part, flat and horizontal but they feature semispherical protrusions 25 and 26 that provide ramped surface portions. The operation of this arrangement is the same as that of FIG. 1. In this case, when the latch is turned, the edges of the upper slot 10 climb up the spherical protrusions 25, 26 and thus these protrusions 25,26 serve to clamp the two sheets 8,9 together.

Figure 10:
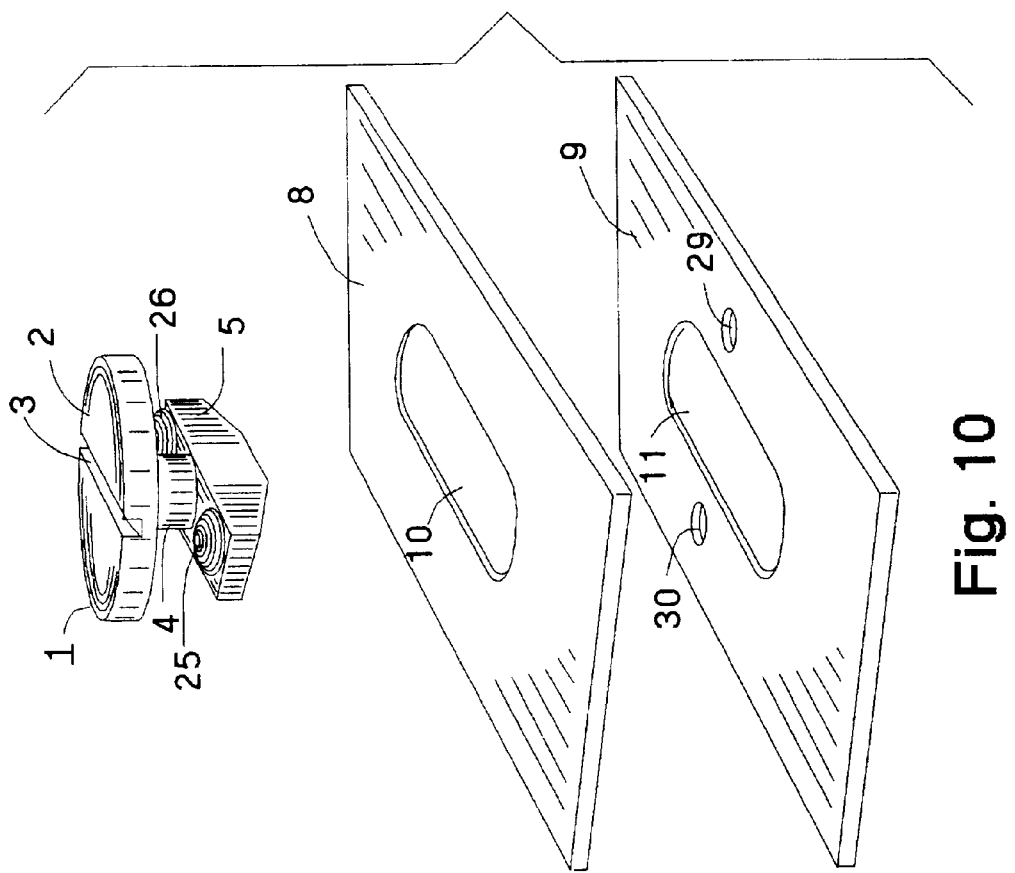
FIG. 10 shows a similar arrangement to that of FIG. 9 but with the latch of FIG. 8 and holes substituted for the smaller slots.
Figure 9:
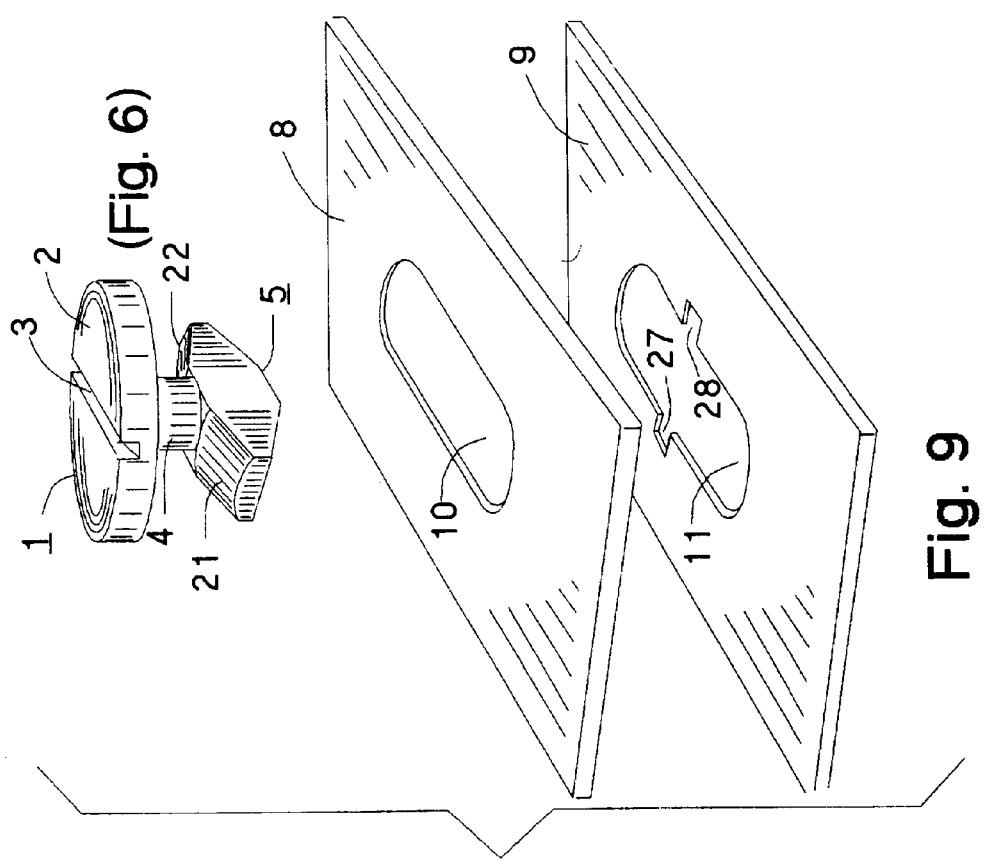
FIG. 9 shows how the latch of FIG. 6 is used with sheet material which has extra smaller transversely extending slots oriented perpendicularly to the main slot to produce an indent effect when the latch is rotated through a ¼ turn.

The arrangements of FIGS. 2, 6, 7 and 8 can be used with a detent in the lower surface 9 to provide an indexing effect for the position of the latch 1 in the locked position. Indents may be provided by a second set of smaller transversely oriented slots 27,28 formed on the sides of the slot 11 in the bottom sheet 9 (FIG. 9). These transverse indexing slots 27 allow an operator to "feel" when he has turned the latch exactly ¼ turn. To accommodate a latch as in FIG. 8, two adjacent holes 29 and 30, as shown in FIG. 10, may alternately be provided. This arrangement also provides an indexing effect upon rotation of the latch 1. This is achieved when the spherical protrusions 25,26 fall into holes 29 and 30. This will occur when the latch is rotated exactly by ¼ turn.

In order to demonstrate an application for the latch according to the invention. FIG. 11 shows a prior art electronic air filter of the charged media type 41 which has a pair of rectangular hollow frames 42 and 43. The filter is held closed with "U"-shaped, external latches 44 and 45. In use, the filter 41 is inserted through slots in air handling units and the external latches 44 make it difficult to insert and retrieve the filter 41 because the latches 44 catch on the sides of the slots. Using a latch 12 or 12a of the design as shown in FIGS. 13 through 14 installed in the hollow frame 42 of the filter eliminates this problem since the head 2 of the latch is even with the filter's frame 42 and does not protrude outside the frame 42.

CONCLUSION

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

What is claimed is:

1. A latch for coupling an upper, perforated, tubular member with outer and inner walls defining an inner cavity to a lower member to be engaged comprising:

1) a rotatable core;
   2) a seating collar carried by the core to block the complete passage of the core through said tubular member;
   3) an elbow protruding from the end of the core, the elbow having a laterally extending leg with an upper locking surface located on the core-side of the leg;
   4) resilient containment means deployed adjacent the core on the side of the collar opposite to the elbow for insertion with the core and elbow through a perforation in the outer wall of a tubular member for expansion within the inner cavity of such tubular member to engage the core therein; and
   5) means for manipulating the resilient containment means to reverse said engagement and permit removal of the core from the cavity into which it has been inserted.

2. A latch core in combination with a first member of a box-tube construction having perforated outer and inner walls with a core-receiving cavity formed therebetween defining inner surfaces on said walls, and a second member having a slot formed therein, wherein the core comprises:

1) a central, rotatable core portion;
   2) engagement means by which the core may be engaged to effect its rotation,
   3) a flange positioned at one end of the core to be located within the cavity to prevents the core from passing fully through the inner wall of the first member;
   4) a displaceple retention means that upon displacement prevents the core from being withdrawn from the cavity;
   and
   5) core extraction means for reversal of the displacement of the displaceable retention means to permit removal of the core from the cavity.

3. A latch core as in claim 2 wherein the displaceable retention means comprises resilient retention means located adjacent said core that, upon insertion into the core-receiving cavity in the first member, expands within the cavity and engages the inner surface of the outer wall of the first member.

4. A latch core as in claim 3 wherein said resilient retention means comprises one or more longitudinally extending locking arms each having a mounted end and a free end that are carried at their mounted ends by the core at the flange end of the core, the other free ends of said arms being biased to spring outwardly into the cavity upon insertion within the cavity.

5. A latch core as in claim 4 wherein:

1) the free end of the arm comprises a locking surface that bears against the inner surface of the outer wall to effect a locking engagement therewith; and
   2) the free end carries a tab mounted inwardly of the locking surface and extending beyond the locking surface to facilitate inward displacement of the arm for removal of the core from the cavity.

6. A latch core as in claim 5 wherein the latch core is dimensioned to lie within the cavity without protruding significantly on the outward side of the outer wall of the first member.

7. A latch core as in claim 4 wherein the latch core is dimensioned to lie within the cavity without protruding significantly on the outward side of the outer wall of the first member.

8. A latch core as in claim 3 wherein the latch core is dimensioned to lie within the cavity without protruding significantly on the outward side of the outer wall of the first member.

9. A latch core as in claim 2 wherein the latch core is dimensioned to lie within the cavity without protruding significantly on the outward side of the outer wall of the first member.

\* \* \* \* \*